United States Patent Office 3,105,049
Patented Sept. 24, 1963

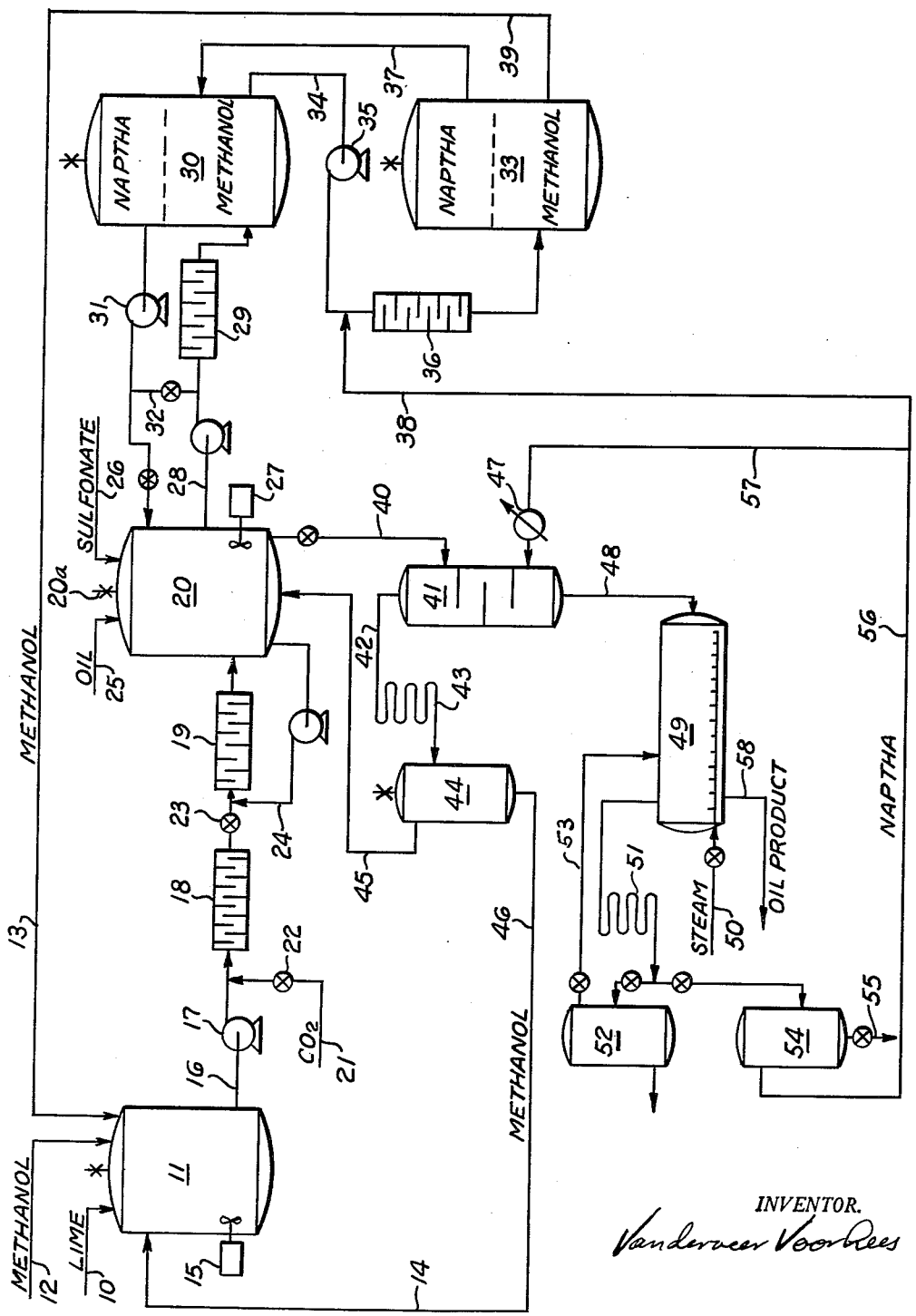

3,105,049
COLLOIDAL DISPERSIONS OF SALTS
Vanderveer Voorhees, Los Altos, Calif., assignor to Bray Oil Company, Los Angeles, Calif., a limited partnership of California
Filed Aug. 1, 1960, Ser. No. 46,459
18 Claims. (Cl. 252—33)

This invention relates to the manufacture of oil dispersions of compounds of the alkaline earth metals. The invention relates also to the manufacture of lubricating oils and additive concentrates therefor, particularly for the lubrication of internal combustion engines. The invention is illustrated by a drawing which shows one embodiment of the process as applied to the manufacture of calcium sulfonate dispersions.

Heretofore, it has been the practice to add to lubricating oils, various substances which impart desired characteristics, such as antioxidants, antiwear agents, extreme pressure agents, detergents to prevent the precipitation of sludge, antiacid agents to absorb acids, both organic and mineral, etc. Antiacid agents are the organic and inorganic bases, such as the amines and the hydroxides and the salts of alkali or alkaline earth metals with weak acids such as carbonic acid, hydrosulfurous acid, boric acid, and the weakly acidic organic aicids, phenols and their derivatives. Calcium and barium alkyl phenates have been widely employed for this purpose.

One of the most widely used class of detergents is the oil soluble sulfonic salts of magnesium, zinc, calcium, strontium or barium. It has long been the practice to incorporate an excess of metal base in such substances beyond the amount required to neutralize the sulfonic acid. The amount of base value obtained in this way may vary from about 5 to 50 alkali value for a concentrated solution of sulfonate in oil containing about 15 to 40 percent sulfonate. Overbasing with barium hydroxide is easier than with calcium hydroxide when the hydroxide is emulsified with the sulfonate in oil and water and the product is then dehydrated and filtered. In general, a concentrate containing 30 to 40% mahogany sulfonate in oil can be overbased with lime to about 20 alkali value. This method was described in the patent of Campbell et al., U.S. 2,485,861. It is not known how the base is held in the oil but it is believed to exist as a complex with the sulfonates.

Considerably increased alkali values are obtainable if carbon dioxide is introduced into the aqueous emulsion of oil and calcium or barium hydroxide, alkali values up to about 80 being obtainable. Such a method is shown in the patent of Warren et al., U.S. 2,830,470. Other methods of incorporating excess alkali in oils involves the use of organic solvents such as the glycols, phenols, and various alcohols, commonly from 1 to 5 carbon atoms.

Some of the processes employ alcohols in the substantial absence of water, for example, Ellis et al., U.S. 2,865,956, and others use alcohols with metal oxides and $CO_2$ as in Carlyl, U.S. 2,861,951.

In all of these processes, the reaction between the acid reactant, $CO_2$, and the base or oxide is effected in the presence of the oil and dispersant in order to instantly disperse the insoluble metal carbonate as it is formed, thereby preventing the growth of crystals which otherwise become visible and render the oil cloudy, murky, unfilterable and generally useless.

I have now discovered that the superbasing reaction with methanol and an acid can be conducted in two stages in which the first stage comprises a solvation of the metal compound and the second stage comprises the dispersion of the compound in oil.

I have found that an oxide or hydroxide of an alkaline earth metal, particularly barium and calcium, can be reacted directly with an acid reagent, such as $CO_2$ in the presence of a large excess of dry methanol, forming a solvated form of the carbonate or complex of unknown composition, and that this product can be dispersed immediately in oils in the presence of oil soluble dispersants to give clear dispersions of the metal compound. If too long a time elapses between the formation of the solvate and the dispersion in oil, large micelles develop, giving a cloudy or an unfilterable product.

I have found that 5 to 50 minutes may elapse before gelation of the solvated compound takes place, depending on temperature and other factors. Under conditions of high rate of agitation and pressure of $CO_2$, the reaction time can be made very short, less than 1 minute, in which case the dispersion can be formed immediately within 1 to 5 minutes after forming the methanol solvate.

When barium oxide is employed with methanol, I prefer to form a solution having an alkali value of about 100 to 200, then treat this solution with the desired acid reactant, such as $CO_2$, preferably after further diluting the solution to an alkali value of 20 to 100.

The alkali value or base number of the final product is easily controlled by the amount of oil-dispersant solution mixed with the solvated metal compound. When using calcium mahogany sulfonate of about 500 molecular weight and 35% concentration, I can obtain base numbers as high as 300 to 350 without excessive increase in oil viscosity.

It is convenient to limit the base number or alkali value to about 200–300, usually about 250. The base number is the milligrams of potassium hydroxide per gram of oil, equivalent to the basicity of the oil as determined by titration with standard acid solution. It is convenient to titrate a 10 gram sample in 100 cc. $CCl_4$, 50 cc. methanol and 50 cc. NaCl brine (15%) using methyl orange indicator and standard HCl solution of 0.1781 normality in which case the burette reading in cubic centimeters at the end point is the acid value in mg. KOH per gram of oil. If the phenolphthalein end point is used, the titration will only show the free alkaline earth metal hydroxide—not the reserve basicity represented by carbonate, phenate, etc.

I have found that the rate of reaction between alkaline earth metal oxides and hydroxides with acid reactants such as $CO_2$ is very rapid in methanol in the absence of oil soluble dispersants, so that my process can be completed in a few minutes, generally less than 15 minutes, whereas prior processes required many hours to reach completion of the reaction. The reasons for this are obscure, but the effect is clearly shown in the examples which follow. Thus, when the methanol phase is separated after mixing with oil and dispersant, sufficient dispersant retained in the methanol may inhibit the reaction when the methanol is used again without redistillation or extraaction of dispersant. In fact, the presence of the dispersant appears to cause the formation of crystals or large micelles in the reaction between the metal oxide or hydroxide and acid reactant such as $CO_2$. The resulting product, when mixed in the next stage with oil and dispersant, is a hopeless mush or magma, entirely unfilterable, or the particles may be so large as to be filtered out, leaving an oil of low alkali value.

In the commercial operation of my process, it is convenient to remove the dispersant from the methanol by extraction with hydrocarbon solvent, rather than distill it after each use. The solvent used in this manner can be added to the oil in the second stage of the process as a diluent to aid further processing.

The function of the hydrocarbon solvent in the process is not clear, but it appears to aid mixing of the methanol-base solvate and the viscous oil by reducing viscosity. In the case of low viscosity oils, it can be omitted entirely. With most lubricating oils and dispersants, the amount of hydrocarbon solvent used is usually about ½ volume to 2 volumes per volume of oil-dispersant used.

Higher alcohols such as isopropyl alcohol have been tried as substitutes for methanol in my process without success and, in fact, have been found to inhibit the methanol solvation reaction if present in substantial amounts.

The invention will be better understood by referring to the following examples:

*Example 1*

Into 250 cc. of U.S.P. methanol was stirred 20 grams of calcium oxide prepared from the ignition of calcium hydroxide. A high speed turbine type mixer was used for the purpose, giving a fine suspension. Into the mixture was passed a stream of carbon dioxide gas for a period of 10 minutes, the temperature rising from room temperature to 145° F. by the exothermic heat of reaction. The carbon dioxide was then discontinued and stirring stopped. The mixture began to thicken to a gel in about 2 minutes. At this point there was added 50 grams of oleic acid—U.S.P.—in solution in 100 grams of white medicinal oil—U.S.P.—and 150 cc. of naphtha (Stoddard solvent).

The mixture quickly separated into two layers, the upper methanol layer measuring 225 cc. The oil layer was heated to 210° F. and then 20 cc. of water was added. Heating was continued and at 240° F. the temperature remained constant for a period of time while considerable foam was dissipated. The oil was dehydrated by heating to 300° F. without gelling or sticking on the heating surface. The product was a light yellow fluid oil which was filtered on a suction filter, using a filter aid. The clear oil had an alkali value of 182, using methyl orange indicator. The sulfated ash was 21.1%.

*Example 2*

Barium oxide was dissolved in methanol to produce a solution which became clear on standing and which titrated 132 milligrams KOH per cubic centimeter. 250 cc. of this solution was diluted with 100 cc. of methanol and a current of $CO_2$ was passed into the mixture while stirring rapidly. The temperature rose to the boiling point of methanol and at the end of 10 minutes the mixture became gelatinous, indicating that the barium oxide had become carbonated to a solvated form of barium carbonate. To this mixture was added 167 grams of calcium mahogany sulfonate of about 35% concentration in lubricating oil, having an ash value of approximately 6.5%, the sulfonate being reduced in viscosity by the addition of 100 cc. of painter's naphtha. The mixture immediately coagulated. On heating it gelatinized and stuck badly on the heating surface. 200 cc. more naphtha was added and the heating continued to expel the methanol at 200° F. It was further heated with steam and finally dehydrated at 350° F. The resulting oil was clear and filtered rapidly on a suction filter with diatomaceous earth filter aid. Titration of the oil gave an alkali value of 1 with phenolphthalein indicator and 172, methyl orange.

*Example 3*

To 400 cc. of methanol was added 30 grams of hydrated lime, and a stream of carbon dioxide gas was passed into the mixture with rapid stirring. The temperature rose from 105° to 142° in 14 minutes, at which time the product developed a viscous, slimy consistency. To this mixture was then added 130 grams of calcium mahogany sulfonate of 35–40% concentration in lubricating oil diluted with 100 cc. of naphtha of 250° average boiling point. The product was a thick emulsion which was diluted with 100 cc. more naphtha. A clear upper layer of methanol quickly separated, leaving a clear oil layer, showing that substantially all the lime had been dissolved. After separating the layers, the oil was heated to 160° F. to expel the remaining methanol. Very slight gelling occurred at this point. The naphtha was then stripped off with steam and the oil dehydrated to a temperature of 330° F. The oil was very clear and filtered rapidly on a suction funnel. The alkali value of the oil was 254, whereas the calculated value, based on pure calcium hydroxide, was 300, showing an efficiency of 84%.

*Example 4*

450 cc. of methanol recovered from the previous run was mixed with 30 grams of hydrated lime and carbon dioxide gas was passed in as in Example 3. The temperature at the start was 105° F., rising to 136° F. in 4 minutes, then falling to 108° F. in 6½ minutes. To the mixture was then added 130 grams of calcium mahogany sulfonate, 35–40% in lubricating oil diluted with 100 cc. of naphtha—250° boiling point. The mixture separated into two layers and the oil layer was heated to 170° F. and filtered to remove visible amounts of unreacted lime. Filtration was slow. The filtrate was evaporated at 330° F. to remove solvent, and the oil refiltered. The product had an alkali value of 1.5 phenolphthalein and 40 methyl orange. The low alkali value of this oil and the difficulty with filtration indicated that the solvation reaction is inhibited by the presence of some constituent of the recovered methanol.

*Example 5*

In this example, 300 cc. of the previously used methanol was mixed with 25 grams of calcium oxide prepared by igniting calcium hydroxide. Carbon dioxide was passed into the mixture and the temperature rose from 107° F. to 138° F. in 4 minutes. The temperature then fell to 112° F. in 7 minutes, and after 10 minutes the carbon dioxide was discontinued. 100 cc. of methanol was added and also 130 grams of calcium sulfonate diluted with 150 cc. of naphtha—250° boiling point. A smooth emulsion resulted which quickly separated. The oil layer contained undissolved solids which were filtered off rapidly. The filtrate was heated to 220° without gelling, then stripped with steam to 330° F. and refiltered. The alkali value of the product was 20, approximately the same as that of the calcium sulfonate-oil solution started with.

*Example 6*

The methanol layer from the previous operation was combined and extracted with painter's naphtha using a ½ volume of naphtha to each volume of methanol. 500 cc. of the clear extracted methanol was mixed with 30 grams of hydrated lime and a stream of carbon dioxide gas was passed in. The temperature rose from 102° to 122° in 5 minutes. The mixture thickened after 8 minutes and 100 cc. more recovered methanol was added. To the mixture was then added a warm solution of 130 grams of calcium sulfonate in lubricating oil diluted with 150 cc. of painter's naphtha. The mixture separated instantly into two layers—the temperature 126°. The oil layer was further diluted with 100 cc. of painter's naphtha and heated to 170° F. to expel remaining methanol. The oil thickened slightly at this point, but rapidly liquefied when stripped with steam. It was dehydrated to 330° F. and filtered rapidly on a suction filter. The product was a clear fluid oil having an alkali value of 2 (phenolphthalein) and 212 (methyl orange). The sulfated ash determined on the product was 29.4%. These results show the feasibility of reclaiming methanol for use in the process by simply extracting with a hydrocarbon, which dissolves the oil soluble dispersant apparently responsible for inhibiting the solvation reaction.

*Example 7*

To 400 cc. of fresh methanol was added 30 grams of hydrated lime and $CO_2$ was injected into the mixture with rapid stirring. The temperature rose from 97° to 138° in 12 minutes but fell to 132° after 14 minutes. The mixture began to thicken at this point, and 130 grams of calcium sulfonate—35% in lubricating oil—dissolved in 200 cc. of crude xylene was added. The mixture effervesced on standing, indicating disengagement of $CO_2$, possibly from bicarbonates formed in the reaction. After one hour the methanol layer was decanted and the thick oil layer, weighing 269 grams, was heated in a water bath. A thick clear gel was observed at 155° F. Introduction of hot water instantly reverted the gel to a thin oil solution, which was stripped of solvent and dehydrated at 330° F. The product filtered rapidly and was a brilliantly clear oil, having an alkali value of 270.

*Example 8*

To 400 cc. of commercial methanol was added 30 grams of hydrated lime in a turbine mixer. Carbon dioxide in the form of Dry Ice was added to the mixture in small bits. The temperature rose from 85° to 114° in 9 minutes and then fell to 95°, indicating the end of the reaction. To the mixture was then added a warm solution of 125 grams of calcium sulfonate, 35% in lubricating oil, dissolved in naphtha of 250° boiling point. The mixture was quite thin, and after standing a short time a milky white layer of methanol rose to the surface. A white solid settled out on the bottom and was removed and washed with naphtha—weight 10 grams. In 20 minutes the methanol layer was completely separated, leaving 280 grams of oil. In 30 minutes a deposit of yellow, semi-solid material separated from the methanol layer, indicating the presence of a complex between the methanol and the oil soluble dispersant. This material was extracted with hydrocarbon solvent and transferred to the oil layer. The methanol layer measured 450 cc. The oil layer was heated to 210° F. without gelling. It was then stripped with steam and dehydrated to 330° F., then filtered very rapidly, showing substantially no solids present in the non-filterable range of particle size, e.g., 1–50 microns. The alkali value of the product was 164, approximately that expected from the utilization of ⅔ of the lime employed.

*Example 9*

This experiment substantially duplicates Example 8, using instead, ⅓ more hydrated lime. The product was more viscous and had an alkali value of 288.

*Example 10*

To 400 cc. of commercial methanol was added 25 grams of calcium oxide derived from the ignition of calcium hydrate at 1500° F. The mixture was rapidly stirred while $CO_2$ gas was passed in. The temperature rose from 108° to 148° F. in 9 minutes and remained at this level for 5 minutes, evaporation of methanol serving to cool the reaction. After 16 minutes the product thickened considerably, partly from loss of methanol by evaporation. 100 cc. of methanol was added, and then was added 130 grams of calcium sulfonate—35% in lubricating oil diluted with 150 cc. of naphtha. The mixture instantly coagulated, as the gel was accepted by the oil phase. A clear yellow layer of methanol separated and was decanted. 100 cc. more naphtha, 250° boiling point, was added, giving a thin gelatinous suspension. The oil layer was heated to 155° F. with some gelling. The addition of 25 cc. of water produced a crumbling mass which reverted to an oil in about 5 minutes. It was stripped of solvent and dehydrated to 330° F. The resulting oil filtered rapidly on a hot suction funnel. The alkali value was 4 (phenolphthalein) and 306 (methyl orange). Ash was determined as 36.9%.

*Example 11*

To 200 cc. of methanol was added 20 grams of calcium oxide prepared from ignition of hydrated lime. The mixture was agitated with a turbine mixer while 35 grams of citric acid dissolved in 200 cc. of methanol was slowly added. After 5 minutes' agitation there was added a solution of 100 grams of calcium mahogany sulfonate—40% concentration in lubricating oil—in 100 cc. of painter's naphtha. A white solid settled out on the bottom of the pan, indicating incomplete dispersion. The oil was filtered out with suction and stripped of solvent. The ash on the clear product was 15%, an increase of 7% over the ash content of the calcium sulfonate-lubricating oil mixture.

*Example 12*

To 300 cc. of commercial methanol was added 20 grams of hydrated lime. The temperature rose at the start then fell to 60° F. while bits of Dry Ice were added with rapid stirring. To the mixture was added a solution of 130 grams of barium thiophosphonate made from the treatment of polybutene with $P_2S_5$ and known commercially as "Amoco 121." This product was a light yellow oil having 14% ash and 45 alkali value.

The resulting mixture was warmed in an oven and congealed to a solid mush, effervescing with liberation of $CO_2$. More naphtha was added, and an attempt was made to heat the mixture to evaporate methanol, but gelling of the heating surface was troublesome. At 210° F. the mass was a clear fluid gel. At 240° F. the product became a heavy grease which was infusible when placed on a hot surface, indicating value as a high temperature lubricating grease. This gel could be reversed to a fluid oil by treatment with a higher alcohol serving to bring about hydration of the calcium complex.

*Example 13*

Barium oxide was dissolved in commercial methanol to produce a solution having an alkali value of 22. To 300 cc. of this solution there was added with rapid stirring small bits of Dry Ice beginning at room temperature. The temperature rose, then fell to about 60° F. in 6 minutes. To this mixture was added 100 grams of Amoco 121 dissolved in 150 cc. of painter's naphtha. The cool mixture was placed in an oven where it was held for 15 minutes while a clear upper layer of methanol separated, bright yellow in color. After ½ hour, the methanol layer became milk-white. It was separated from the oil and the latter—230 grams—was heated to expel remaining methanol. Some gelling occurred, but the addition of 100 cc. more naphtha gave a clear solution which was heated to 220° F. then stripped with water and steam. The product became mushy without liquifying, but the addition of 10 cc. of butyl alcohol reversed the emulsion, to give a thin oil solution which was dehydrated at 330° F. and filtered rapidly. The product was an opalescent pale red oil having an alkali value of 80 and a sulfated ash of 21.2%. The ash calculated from the increased alkali value and the ash of the starting product was 21.3%.

*Example 14*

To 300 cc. of isopropyl alcohol was added 30 grams of hydrated lime in a turbine mixer. $CO_2$ gas was passed into the mixture at 110° F. The temperature fell rapidly to 108° F. in 2 minutes, showing no reaction occurring. 50 cc. methanol was then added while $CO_2$ was continued. The temperature continued to fall to 106° in 4 minutes, indicating no solvation of the lime in the presence of propyl alcohol.

Referring to the drawing, lime, either hydrated or quick lime, is introduced by line 10 to feed tank 11 while anhydrous methanol is introduced by line 12. Recycle methanol is also added by lines 13 and 14 as desired, the total amount of methanol being about 5 to 20 times the amount of lime by weight to form a thin slurry in tank 11, agitated by mixer 15. It is desirable that the lime be in the form of a fine powder to facilitate mixing.

From tank 11 the slurry passes by line 16 and pump 17 through mixers 18 and 19, thence into dispersing vessel 20. In mixer 18 the lime is reacted with $CO_2$ introduced by line 21, either as a gas or a liquid, controlled by valve 22. Mixers 18 and 19 can be of the orifice type or the mechanical type in which a high speed agitator is driven by a motor to insure thorough contact between the carbon dioxide, lime and methanol. The amount of $CO_2$ should be slightly in excess of the molar ratio of 1 to 1 in respect to the lime, generally 5 to 25% excess. The reaction is very rapid, especially with high rates of mixing. Pressure also facilitates the reaction and it is desirable to employ pressures of 1 to 10 atmospheres gage. Pressure may be maintained on mixer 18 by control valve 23. The rate of flow and the volume of mixer 18 is sufficient to provide a reaction time of about 1 to 10 minutes, reaction time of 15 to 50 minutes being satisfactory at low temperatures.

Mixer 18 can be provided with cooling means to remove heat of reaction, although it is usually preferred to employ sufficient methanol in the feed slurry to absorb the heat of reaction, either by sensible heat or by latent heat of vaporization. Vent line 20a may conduct methanol vapors by a line not shown to a condenser, if desired. Part of the heat of reaction can be absorbed by introducing liquid $CO_2$ into the reaction. A suitable reaction temperature is between 100 and 200° F., usually 125 to 150° F., although temperatures as low as 50° F. have been used successfully.

In mixer 19, the solvated lime compound and methanol are contacted with oil and dispersant recycled by line 24 from tank 20. The process can be operated continuous or batch, but it is preferred to operate semi-continuous by duplicating tanks 11 and 20 and switching the stream from one to the other as well known in the art. Tank 20 is charged with lubricating oil by line 25 and sulfonate dispersant or other dispersant, alkylalicylate, fatty acid, alkylnapthenate, phosphonates from $P_2S_{25}$ treatment of olefines or alcohols, etc. by line 26. When employing sulfonates, I prefer to use a calcium sulfonate of about 400 to 600 mol. wt., in a concentration of about 10 to 50% based on the oil-sulfonate mixture. Mixer 27 serves to keep the contents uniform.

In addition to the oil and sulfonate, I prefer to use a volatile hydrocarbon diluent—generally in the ratio of ½ to 3 volumes of diluent per volume of oil-sulfonate mixture. Petroleum naphthas boiling in the range of about 250 to 300° F. are convenient. Aromatic solvents such as toluene or xylene can be used but are less convenient in a later stage of the process as will be described.

On contacting with the oil in mixer 19, the solvated lime instantly disperses therein, usually with disengagement of some $CO_2$ and most of the methanol. The methanol rises to form a layer in the top of tank 20 where, after a short time, usually one to four hours, it becomes clear, tho colored yellow. When sufficient lime has been introduced into tank 20 in this manner to give the desired degree of basicity, e.g., 250 alkali value, the contents are allowed at settle. Methanol is drawn off by line 28 leading to mixer 29 and separator 30. Naphtha collected in the top of separator 30 is recycled through mixer 29 by pump 37 and line 32. The naphtha serves to extract from the methanol phase, dissolved lubricating oil and oil-soluble dispersant which have been found to inhibit the solvation reaction when the methanol is reused in the process. If desired, all the methanol can be redistilled, in which case it is not necessary to perform the extraction just described.

A second stage of methanol extraction is shown at 33, the methanol passing by line 34, pump 35 and mixer 36 to separator 33 where the naphtha rises as an upper layer and is passed by line 37 to separator 30. Freshly recovered naphtha enters mixer 36 by line 38. Extracted methanol flows by line 39 and 13 back to the feed tank 11. When using aromatic naphthas, it is difficult to effect a separation from the methanol, owing to the small difference in density and increased solubility.

The oil phase in the bottom of tank 20 passes by line 40 to stripper 41 where remaining uncombined methanol is removed as a vapor by line 42, condensed in 43 and collected as anhydrous methanol in the bottom of receiver 44. Naphtha collecting in the top of 44 passes by line 45 back to tank 20 or to mixer 36 by line not shown. Methanol flows by line 46 and 14 back to stock tank 11. Heat to operate stripper 41 is preferably introduced in the form of solvent vapors from heater 47.

Stripped oil passes by line 48 to steam still 49 where the naphtha is stripped off in a current of steam introduced by line 50. Heat may be supplied to still 49 by gas firing, by "Dowtherm" coils or other conventional means. The first runnings from the still are condensed in condenser 51 and passed to receiver 52 where water, naphtha and methanol collect, the methanol being disengaged from the oil-carbonated lime-dispersant system by the steam. Naphtha from the top of 52 is returned to the still by line 53 while the wet methanol is processed elsewhere for the recovery of dry methanol to be returned to the process.

When all methanol is off, the condensate is diverted to receiver 54 where water is separated by line 55 and dry naphtha passes by lines 56 and 38 back to methanol extractor 36, a portion flowing by line 57 to vaporizer 47 for operating stripper 41 as described above.

The oil in still 49 is heated gradually to about 325 to 350° F., then drawn off by line 58 leading to storage. It is usually desirable to flash it into a vacuum chamber to obtain complete dehydration, then pass it thru a filter to remove a small amount of undissolved lime solids. Filtration is facilitated by the addition of 1 to 3% of filter aid such as diatomaceous earth. The product is a clear red oil flowing freely at room temperature and diluting in neutral oils or naphtha without cloud, showing that the calcium compounds contained in it have particles below the visible range, i.e., 0.4 micron and smaller, generally below 0.1 micron.

The drawing illustrates the invention as it is specifically applied to making calcium carbonate dispersions in oils stabilized with sulfonates such as the mahogany sulfonates from treatment of lubricating oils with oleum or the alkylbenzene sulfonates. Modifications of the process will be made when using barium oxide or hydroxide, in which case the barium oxide is usually dissolved in methanol in feed tank 11 and any insoluble sludge is allowed to settle before using the solution in mixer 18, thus avoiding the problem of removing these fine solids from the oil product. Mixed metal dispersions can also be made by combining barium and calcium hydroxides or oxides in tank 11 or by employing a calcium dispersant such as calcium sulfonate with a solvated barium compound or vice versa.

When employing dispersants of high water repellency such as calcium salts of thiophosphoric acids derived from the treatment of polybutenes with $P_2S_5$, I find it convenient to introduce an alcohol of three to six carbon atoms preferably butyl alcohol into still 49 to aid in hydrating the calcium complex. When employing an alcohol in this fashion, means must be provided for its recovery and reuse, usually a fractionating column on still 49 to separate the methanol from the higher alcohol.

Altho I have described my invention with respect to specific examples, I do not intend that it be limited thereby except as defined in the following claims. For the purpose of this application, I employ the term "lime" to mean either the oxide of calcium-quick lime—or the hydrate. When using calcium oxide, I find the oxide made by ignition of the hydrate is much more reactive than that produced commercially from burning limestone. Ignition of the hydrate at a temperature of about 1500° F. for several hours gives a very reactive product. Likewise, I employ the term "baryta" to mean either the monoxide of barium—BaO—or the hydrate—$Ba(OH)_2$. In some cases, the latter compound may contain small amounts of water of crystallization, but in general, this is to be avoided. Similarly, the term "strontia" is used herein to mean either the oxide or its hydrate.

Many acid reactants are suitable but it is generally desirable to employ only those which form water insoluble salts with the respective metal employed. Thus, boric or phosphoric acid can be employed with calcium or barium, it being desirable to employ the acid anhydrides $B_2O_3$ or $P_2O_5$ in dilute solution in methanol. Because of its convenience and inertness as well as its volatile character, carbonic acid, of which $CO_2$ is the anhydride, is preferred for most purposes.

The oil soluble dispersants employed are of the acidic nature, such as the fatty acids of more than 12 carbon atoms, oleic, stearic, linoleic acid dimer, etc., alkyl aromatic acids such as abietic acid and alkyl benzoic acids of more than 12 carbon atoms, petroleum acids such as naphthenic acids, alkyl phenols soluble in oil such as dioctyl and dibutyl phenol, and the oil soluble acids in general possessing surface active properties.

Of the oils suitable for making dispersions according to my process, the mineral oils are preferred—particularly lubricating distillates from petroleum, neutral oils, etc. Residual oils can also be used, such as bright stocks. Medicinal grade oils can be used for special purposes, as can also the ester oils such as dioctyl adipic ester or azelaic ester.

Having thus described my invention, what I claim is:

1. The process of making colloidal dispersions of salts in oils which comprises mixing with anhydrous methanol a compound selected from the class consisting of the oxides and hydroxides of alkaline earth metals in the ratio of at least 5 parts of methanol to 1 part of said compound by weight, rapidly introducing an acid reactant selected from the class of the inorganic acids and acid anhydrides which form water insoluble salts with said metals into the resulting mixture at a temperature above which an exothermic reaction is initiated, thereby forming a complex compound between said acid reactant and said metal compound solvated by methanol, then immediately, before gelling occurs, forming an emulsion with said complex and methanol, an oil and an emulsifying agent selected from the class consisting of oil soluble organic acids and their salts having at least 12 carbon atoms and thereafter removing methanol from the resulting emulsion.

2. The process of claim 1 wherein a volatile hydrocarbon solvent is present in the said emulsion and is removed from the final dispersion product by distillation.

3. The process of claim 1 wherein the weight of methanol employed is in the range of 10 to 20 times the weight of said alkaline earth compound mixed therewith.

4. The process of claim 1 wherein said acid reactant is carbon dioxide.

5. The process of claim 4 wherein the final product is filtered to insure freedom from contaminating solid particles, unreactive with carbon dioxide and methanol.

6. The process of claim 1 wherein said acid reactant is selected from the class consisting of the anhydrides of boric and sulfurous acids.

7. The process of claim 1 wherein the said emulsion contains a volatile hydrocarbon solvent in a volume at least equal to the volume of said oil and emulsifying agent and said solvent is distilled from the final reaction product after removal of methanol.

8. The process of claim 7 wherein the reaction product is treated with water at an elevated temperature after removing methanol and before distilling said solvent, thereby preventing formation of gels.

9. The process of dispersing an alkaline earth metal carbonate in oil in a state of subdivision below the range of visibility which comprises contacting an alkaline earth metal compound selected from the class of oxides and hydroxides with at least five times its weight of methanol in the substantial absence of water, introducing carbon dioxide into the mixture at a temperature of between about 50° F. and the boiling point of methanol at the prevailing pressure thereby forming a solvated compound of alkaline earth metal and carbonic acid, immediately, before gelling occurs, forming an emulsion of said compound-methanol slurry with an oil solution of a preferentially oil soluble sulfonic acid compound and separating the methanol from the product.

10. The process of dispersing calcium carbonate in an oil solution of calcium oleate which comprises contacting finely divided calcium oxide with 5 to 40 times its weight of anhydrous methanol, introducing carbon dioxide into the mixture while agitating for a period of about 1 to 15 minutes at a temperature above about 100° F., until the absorption of carbon dioxide substantially ceases, then immediately, before gelling occurs, adding a solution of oleic acid in an oil and a volatile hydrocarbon solvent, removing methanol and the hydrocarbon solvent, leaving a transparent dispersion of calcium carbonate in said oil.

11. The process of claim 10 wherein the said oil is a white mineral oil of medicinal grade.

12. The process of claim 10 wherein the oil is a fatty acid ester.

13. The process of making a highly basic lubricating oil additive which comprises dispersing lime in at least ten parts of anhydrous methanol by weight, introducing carbon dioxide with rapid agitation until one molecular equivalent has been absorbed, then immediately, before gelling occurs, forming an emulsion between the reaction product including said methanol and 2 to 10 parts of a solution of a lubricating oil and an oil soluble dispersant, removing said methanol as a separate liquid phase and recovering a clear dispersion of calcium carbonate in said oil.

14. The process of claim 13 wherein said dispersant is calcium mahogany sulfonate in a concentration of 10 to 50% by weight of said oil solution.

15. The process of claim 14 wherein a volatile hydrocarbon solvent is present in said emulsion in an amount equal to ½ to 5 volumes per volume of the said oil solution.

16. The process of claim 15 wherein the emulsion is treated with water at an elevated temperature after removal of the methanol phase, whereupon the dispersion is dehydrated and stripped of hydrocarbon solvent.

17. The process of claim 13 wherein the said methanol phase is extracted with a hydrocarbon solvent which removes substances inhibiting the reaction between carbon dioxide and lime and thereafter recycling the methanol in the process.

18. The process of making transparent oil dispersions of barium and calcium compounds which comprises preparing a solvated form of said compound by forming in the first stage a mixture of methanol an inorganic acid reactant which forms insoluble salts with calcium and barium and a base selected from the class consisting of lime and baryta in the substantial absence of water, then immediately, before gelling occurs, combining said mixture in the second stage with an oil, an oil-soluble dispersing agent and a hydrocarbon solvent, separating the resulting product into a methanol layer and an oil layer, extracting the methanol layer with hydrocarbon solvent to recover dispersing agent dissolved therein, recycling the extracted methanol to the first stage of the process and distilling hydrocarbon solvent and remaining methanol from the oil layer to produce the desired oil dispersion.

References Cited in the file of this patent

UNITED STATES PATENTS

| | | |
|---|---|---|
| 2,501,732 | Mertes | Mar. 28, 1950 |
| 2,723,235 | Asseff et al. | Nov. 8, 1955 |
| 2,956,018 | Carlyle et al. | Oct. 11, 1960 |

FOREIGN PATENTS

| | | |
|---|---|---|
| 209,175 | Australia | July 2, 1957 |